United States Patent
Poole et al.

(10) Patent No.: US 9,189,866 B2
(45) Date of Patent: Nov. 17, 2015

(54) VASCULAR TREE FROM ANATOMICAL LANDMARKS AND A CLINICAL ONTOLOGY

(71) Applicants: KABUSHIKI KAISHA TOSHIBA, Tokyo (JP); Toshiba Medical Systems Corporation, Tochigi (JP)

(72) Inventors: Ian Poole, Edinburgh (GB); Colin Roberts, Edinburgh (GB); Paul Norman, Edinburgh (GB); Alison O'Neil, Edinburgh (GB)

(73) Assignees: KABUSHIKI KAISHA TOSHIBA, Tokyo (JP); TOSHIBA MEDICAL SYSTEMS CORPORATION, Tochigi (JP)

( * ) Notice: Subject to any disclaimer, the term of this patent is extended or adjusted under 35 U.S.C. 154(b) by 0 days.

(21) Appl. No.: 13/963,346

(22) Filed: Aug. 9, 2013

(65) Prior Publication Data
US 2014/0254906 A1    Sep. 11, 2014

Related U.S. Application Data

(63) Continuation-in-part of application No. 13/792,572, filed on Mar. 11, 2013, now abandoned.

(51) Int. Cl.
*G06T 7/60* (2006.01)

(52) U.S. Cl.
CPC .............. *G06T 7/608* (2013.01); *G06T 2200/04* (2013.01); *G06T 2207/10081* (2013.01); *G06T 2207/10088* (2013.01); *G06T 2207/30101* (2013.01); *G06T 2207/30172* (2013.01)

(58) Field of Classification Search
None
See application file for complete search history.

(56) References Cited

U.S. PATENT DOCUMENTS

| | | | |
|---|---|---|---|
| 7,379,062 B2 | 5/2008 | Poole | |
| 2006/0122501 A1 | 6/2006 | Lara-Montalvo et al. | |
| 2006/0250386 A1 | 11/2006 | Movassaghi et al. | |
| 2010/0021025 A1* | 1/2010 | Hof et al. | 382/128 |
| 2011/0206248 A1 | 8/2011 | Ruijters | |

OTHER PUBLICATIONS

Passat, Nicolas, et al. "Region—growing segmentation of brain vessels: An atlas—based automatic approach." Journal of Magnetic Resonance Imaging 21.6 (2005): 715-725.*
Antonio Criminisi, et al., "Decision Forests with Long-Range Spatial Context for Organ Localization in CT Volumes", MICCAI 2009, http://research.microsoft.com/apps/pubs/default.aspx?id=81675, 2009, 13 pages.

* cited by examiner

*Primary Examiner* — Bhavesh Mehta
*Assistant Examiner* — Raphael Schwartz
(74) *Attorney, Agent, or Firm* — Oblon, McClelland, Maier & Neustadt, L.L.P.

(57) ABSTRACT

A medical image processing apparatus, comprises a landmark identification unit configured to process a medical image data set to identify a landmark corresponding to a part of a branching structure according to a stored anatomical representation, and a spatial analysis unit configured to process the image data set to determine a spatial configuration of at least part of the branching structure.

21 Claims, 11 Drawing Sheets

VASCULAR TREE FROM ANATOMICAL LANDMARKS AND A CLINICAL ONTOLOGY

CROSS-REFERENCE TO RELATED APPLICATIONS

This application is a continuation-in-part application of, and claims the benefit of priority under 35 U.S.C. §120 from U.S. application Ser. No. 13/792,572, filed Mar. 11, 2013, herein incorporated by reference.

FIELD

Embodiments described herein relate generally to a method of, and an apparatus for, medical image processing and, in particular though not exclusively, for automatically determining and labelling the path of a vascular tree in a three-dimensional image data set.

BACKGROUND

Vascular analysis is a common clinical application of image analysis technology. For example, it is known to use image analysis technology for the analysis of three-dimensional (3D) image data of a vascular structure acquired using Computed Tomography (CT) or Magnetic Resonance Imaging (MRI) techniques. According to known techniques, identification of different branches of the vascular structure can be performed manually, for example by manually identifying the extremities of each branch. Subsequently, an algorithm is implemented, which determines the path of each branch from the 3D image data to provide quantitative 3D information for each branch. It is also known to manually label the different branches of the vascular structure.

However, manual identification and labelling of different branches of a vascular can be time-consuming and can, in particular, prevent the provision of quantitative spatial information in real-time or near real-time as may be required when performing an invasive diagnostic procedure such as a CT Angiogram (CTA) or a Magnetic Resonance Angiogram (MRA) or when performing a percutaneous intervention, for example, when performing angioplasty or when deploying a stent.

Detecting, tracking, labelling and segmentation of vascular structures and other branching structures is difficult. Known methods for automatically identifying a vascular structure in a patient generally rely upon a comparison of 3D image data of the vascular structure with 3D image data of corresponding vascular structures in other patients or upon registering a 3D image data set with a typical 3D image data set from an anatomical atlas. Some known methods of labelling a vascular structure rely upon specific tree labelling algorithms, for example based upon determining a topology of the vascular structure and then comparing the determined topology of the vascular structure with a typical topology of the vascular structure.

Tracking of vascular structures, or other branching structures can present particular difficulties when the part of the branching structure is distal from the root of the branching structure, for example terminal vessels arising from remote branching points. Such distal parts of the branching structure are usually narrower than main parts of the branching structure nearer the root, making them harder to detect and track.

The tracking and identification of such sub-branches can, nevertheless, be important, for example for inspection of vessels for pathology (for example, artherosclerosis, stenoses, aneurysms), measurement of pathology (for example, vessel diameter in the cases of stenosis) and treatment planning (for example, stent insertion, catheter access).

BRIEF DESCRIPTION OF THE DRAWINGS

Embodiments are now described, by way of non-limiting example only, and are illustrated in the following figures, in which.

DETAILED DESCRIPTION

Certain embodiments provide a medical image processing apparatus, comprising a landmark identification unit configured to process a medical image data set to identify a landmark corresponding to a part of a branching structure according to a stored anatomical representation, and a spatial analysis unit configured to process the image data set to determine a spatial configuration of at least part of the branching structure. The at least part of the branching structure may be distal from the landmark, and the processing of the image data set to determine the spatial configuration may be performed in dependence on data from the stored anatomical representation. The part of the branching structure that is distal from the landmark may be understood to be a part of the branching structure that is distal from the landmark in a direction away from a root of the branching structure.

Certain embodiments also provide a medical image processing method, comprising processing of a medical image data set to identify a landmark corresponding to a part of a branching structure according to a stored anatomical representation, and processing of the image data set to determine a spatial configuration of at least part of the branching structure.

Figure 1:
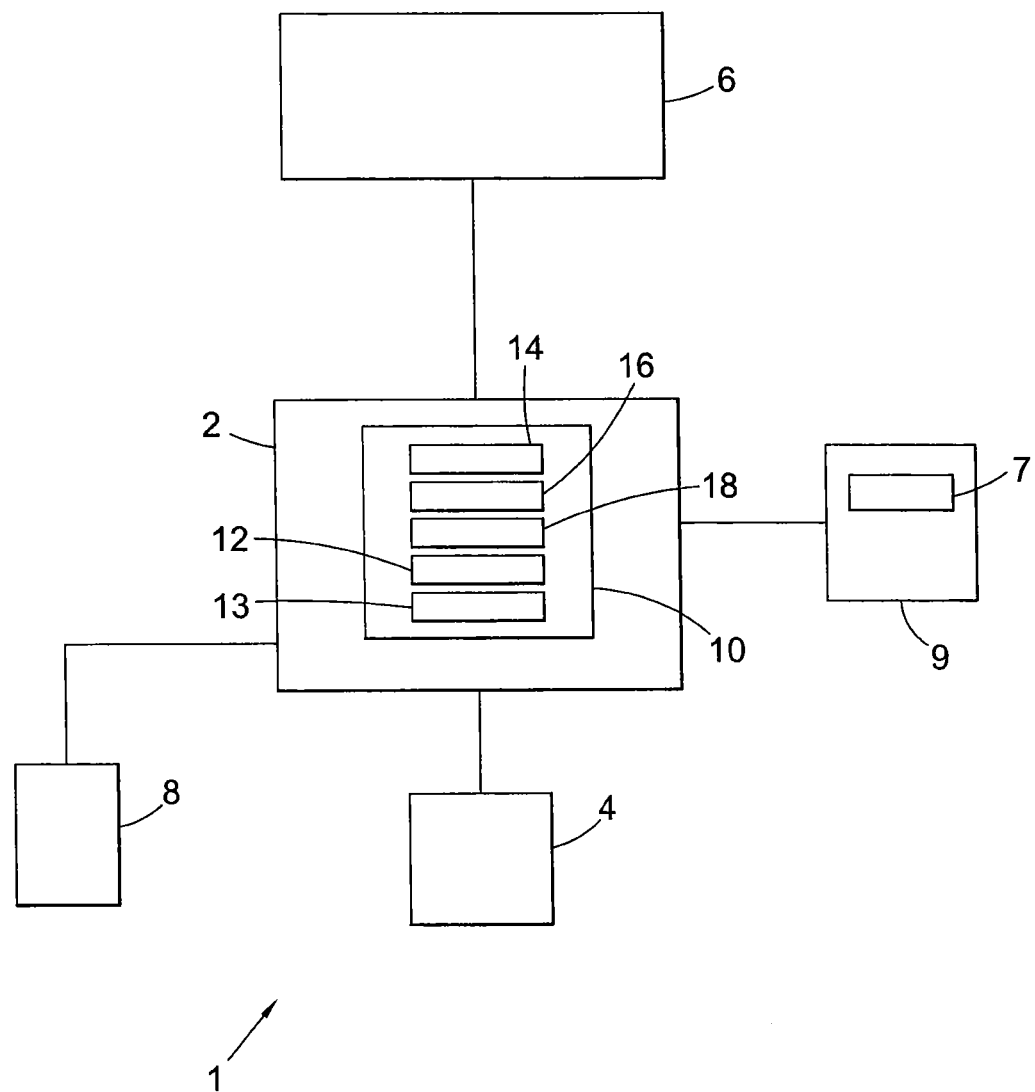
FIG. 1 is a schematic diagram of an image processing system according to an embodiment.

A medical image processing system 1 according to an embodiment is illustrated schematically in FIG. 1 and comprises a processing apparatus 2 configured to implement the methods as described above. In the embodiment shown in FIG. 1, the processing apparatus 2 may comprise a personal computer (PC) or workstation. The processing system 1 further comprises a display device 4, a CT scanner 6 and a user input device or devices 8, in this case a computer keyboard and mouse. The system 1 also includes a data store 9.

Any suitable type of CT scanner may be used that is able to perform 3D CT measurements on a patient or other subject, for example one of the Aquilion® series of scanners produced by Toshiba Medical Systems Corporation. Although the embodiment of FIG. 1 is described in relation to CT scan data, any other suitable type of scanner producing any suitable type of image data may be used in alternative embodiments, for example MR data of suitable form.

The processing apparatus 2 provides a processing resource for automatically or semi-automatically processing image data, and comprises a central processing unit (CPU) 10 that is able to load and operate a variety of software units or other software components that are configured to perform a method as described in detail below with reference to FIG. 2.

The software units include a landmark identification unit 12 for detecting a plurality of landmarks in a branching structure, in this case vascular landmarks, a landmark selection unit 13 for the selection of one or more of the landmarks, each pair associated with a different segment of the branching structure, a label identification unit 14 for identifying labels for the segments, and a spatial analysis unit 16 for determining a quantitative spatial configuration such as a path or a centerline of each segment. The software units also include a graphics unit 18 for generating a signal for the display of the quantitative spatial configuration of the segments and the labels of the segments on the display device 4.

The processing apparatus 2 includes a hard drive and other components of a PC including RAM, ROM, a data bus, an operating system including various device drivers, and hardware devices including a graphics card. Such components are not shown in FIG. 1 for clarity. Any other suitable processing apparatus may be used in alternative embodiments.

In the embodiment of FIG. 1 a 3D image data set 7 is received by the processing apparatus 2 from the CT scanner 6 following acquisition of a scan by the scanner 6, and is stored in the data store 9 and processed by the processing apparatus 2.

In a variant of the embodiment of FIG. 1, the processing apparatus 2 receives a 3D image data set from a remote data store (not shown). The remote data store stores a large number of different data sets obtained from many different scanners over an extended period of time together with associated patient data, for example a data store forming part of a Picture Archiving and Communication System (PACS).

Figure 2:
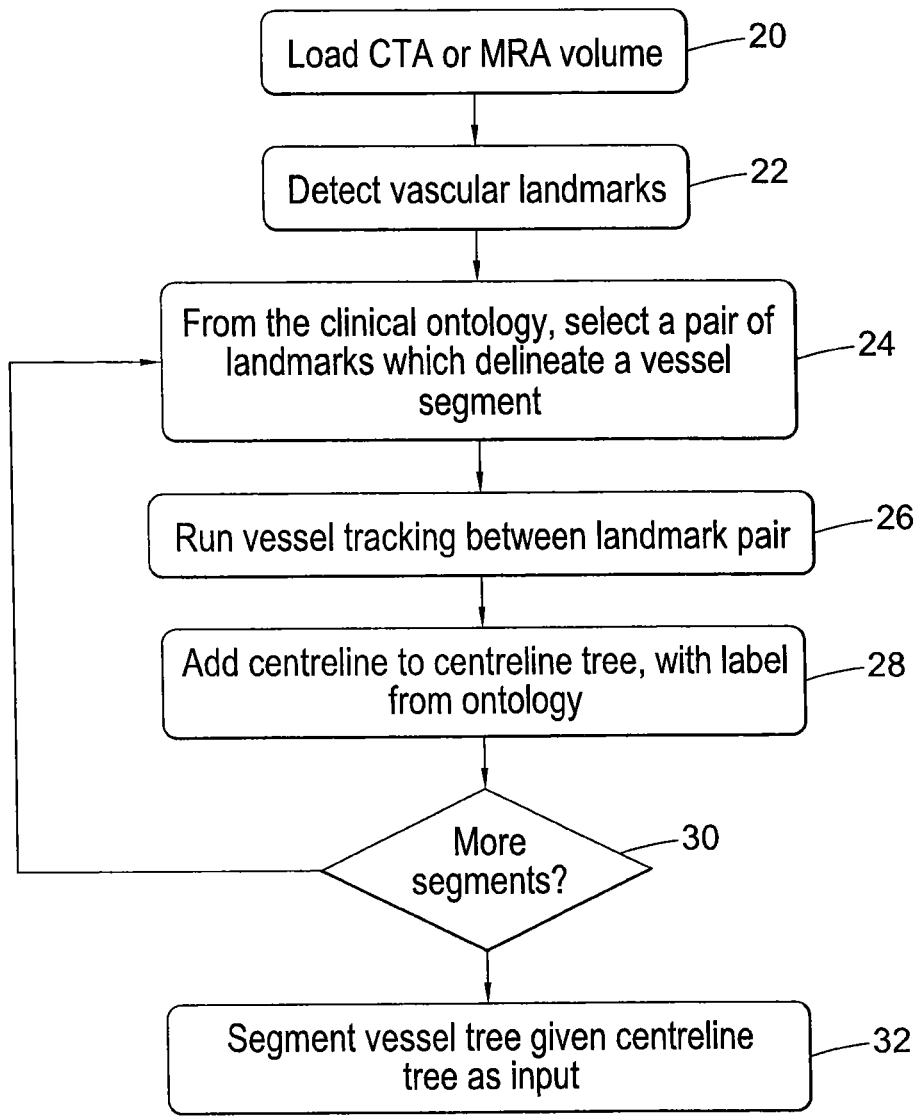
FIG. 2 is a flow chart illustrating in overview a mode of operation of the image processing system of FIG. 1.

The system of FIG. 1 is configured to perform a method of medical image processing having a sequence of stages as illustrated in overview in the flow chart of FIG. 2.

At the first stage 20, the processing apparatus 2 receives a 3D image data set 7 from the data store 9. In other modes of operation, the processing apparatus 2 may receive a 3D image data set directly from the CT scanner 6. In this example, the 3D image data set is acquired by the CT scanner 6 during a CT angiogram (CTA) procedure. In other embodiments, the 3D image data set may be acquired by the CT scanner 6 during other types of CT diagnostic procedures. It should also be understood that the 3D image data set may be acquired by other types of scanner, for example an MRI scanner, during diagnostic or other imaging procedures of any kind, for example, during angiogram procedures.

At the next stage of the process 22, the landmark identification unit 12 automatically detects landmarks such as branch points of a vascular tree in the 3D image data set 7. In this case, the landmark identification unit 12 uses known processes to automatically detect each of the landmarks. In this case machine learning processes are used to identify landmarks, but any other suitable process can be used. An example of a known machine-learning process for automatically detecting vascular landmarks is described, for example, in Criminisi, A, J Shotton, and S Bucciarelli. "Decision Forests with Long-Range Spatial Context for Organ Localization in CT Volumes." in MICCIA 2009, 2009. Any other suitable method for detecting vascular landmarks, such as registration of the image data set 7 to an anatomical atlas, can be used in alternative embodiments. Alternatively, the landmarks can be identified manually, with the landmark identification unit 12 identifying the landmarks based upon user input via a user interface, for example identification by a user of landmark locations on a displayed image.

Figure 3:
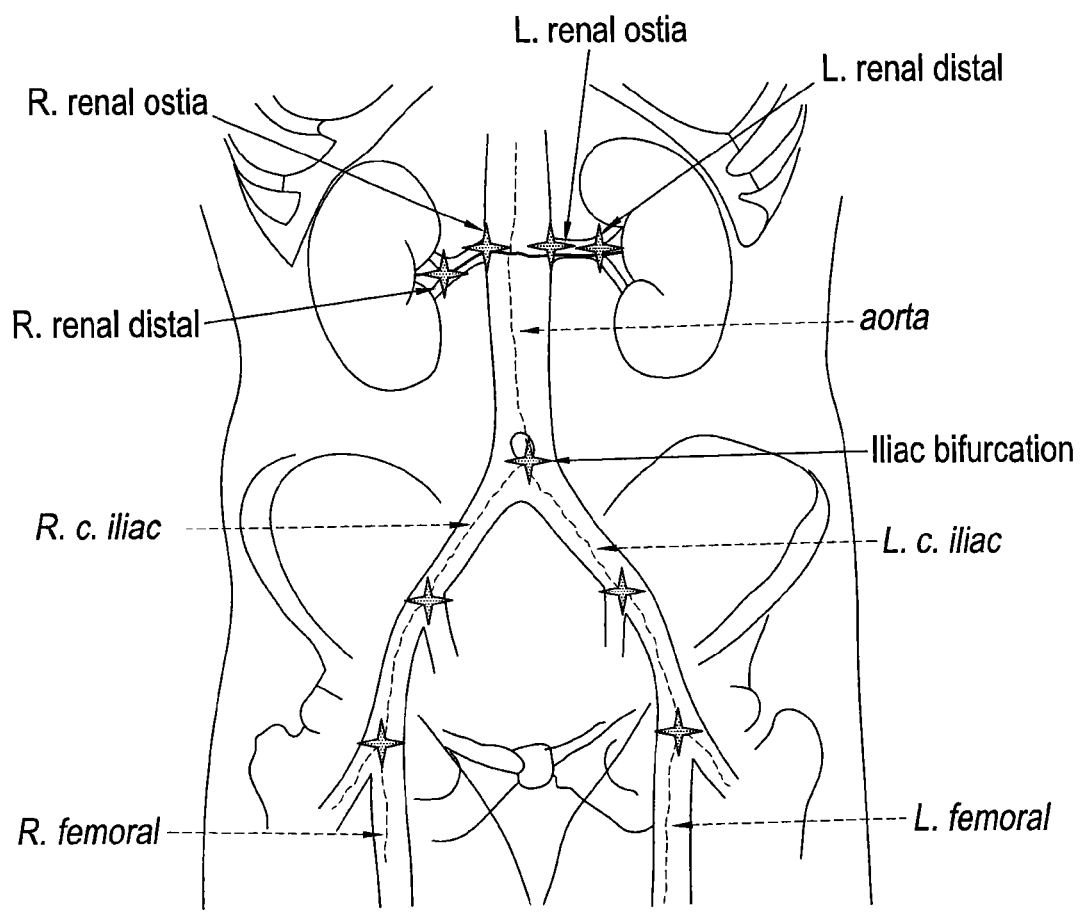
FIG. 3 schematically illustrates the detection of vascular landmarks according to a mode of operation of the image processing system of FIG. 1.

FIG. 3 illustrates various vascular landmarks in the abdominal region of a human patient. Vascular landmarks are indicated in FIG. 3 by crosses, and tracked vessel centrelines are indicated by dashed lines.

Figure 4A:
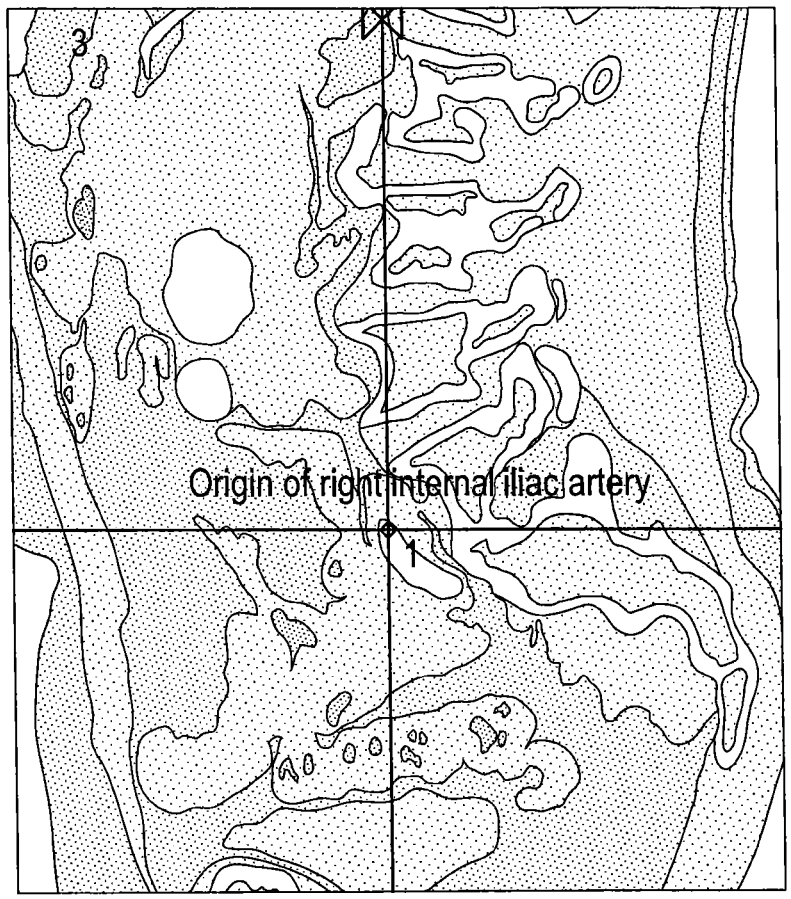
FIGS. 4(a) and 4(b) illustrate the detection of a vascular landmark of a CT image according to a mode of operation of the image processing system of FIG. 1.
Figure 4B:
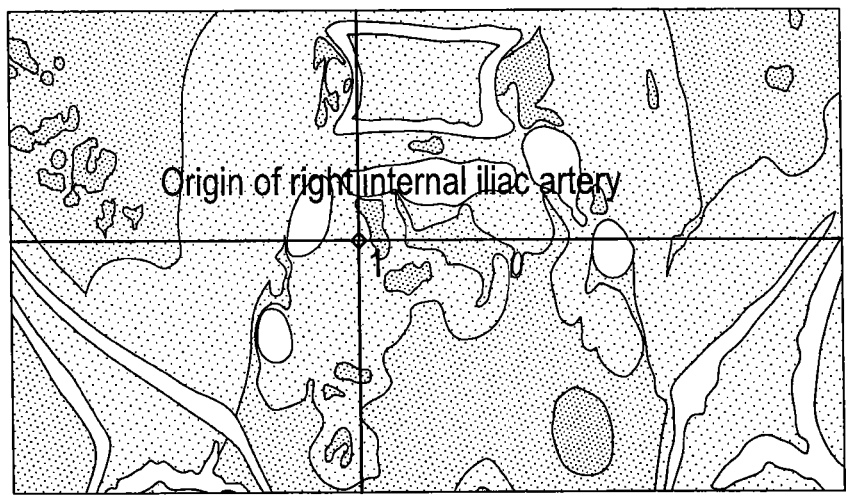

FIGS. 4(a) and 4(b) show CT images illustrating the detection of a vascular landmark according to a mode of operation of the image processing system 1 of FIG. 1. In each case, the landmark identification unit 12 has detected the origin of the right internal iliac artery by comparing the CT image with one or more historical CT images.

At the next stage of the process 24, the processing apparatus 2 receives an anatomical representation which relates vascular landmarks to vessel segments and vessel segments to labels for vessel segments. In the embodiment of FIG. 1, the anatomical representation is stored in the data store 9. In other embodiments, the anatomical representation may be stored in a remote data store (not shown).

In the embodiment of FIG. 1, the anatomical representation defines anatomical relationships using non-image data and comprises the Foundation Model of Anatomy (FMA) clinical ontology. In other embodiments, the anatomical representation may be a SNOMED clinical ontology or a RadLex clinical ontology or any combination of the FMA, SNOMED and RadLex clinical ontologies. Such clinical ontologies use standardised anatomical terms and controlled vocabularies. Such clinical ontologies link relevant non-imaging information such as vessel topology and vessel segment labels to vascular landmarks.

Figure 5:
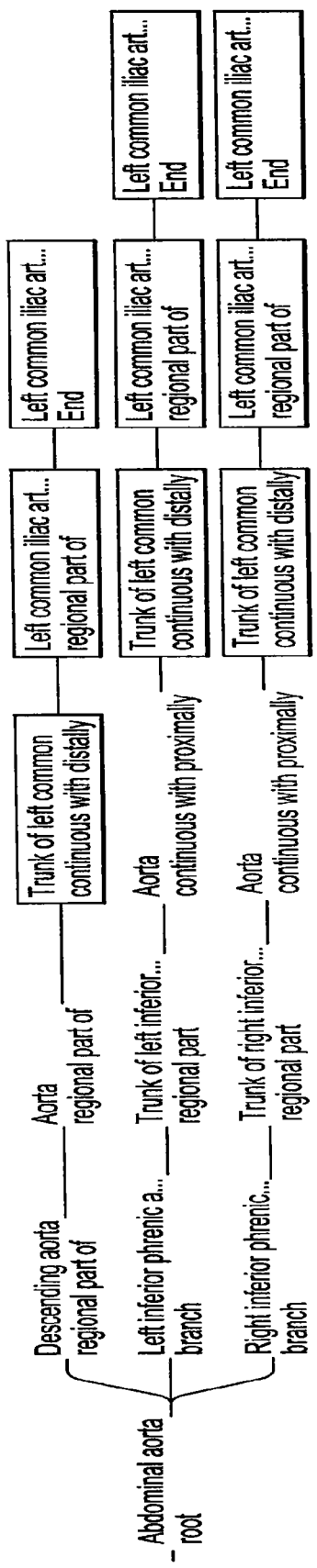
FIG. 5 is a tree representation of a path linking vascular landmarks derived using a clinical ontology.

The anatomical representation can include links between landmarks and equivalent ontology terms. The ontology can also include connectivity relationships, for example <part of >, <tributary>, <continuous with> that relate different nodes represented by different ontological terms. A tree representation is provided in FIG. 5 showing paths through an ontology that connect terms linked to landmarks that have connected relationships.

It is a feature of embodiments that the clinical ontology can be linked to data representing at least one expected property of the branching structure, for example a typical value of at least one property of branching structures of the same type as the branching structure. The data may be stored in a separate database, or as separate entries in the same database, as the clinical ontology, and the linking of the clinical ontology to the data representing expected properties may comprise linking entries in the database or databases. The data may represent, for example, at least one of vessel diameter, number of branches, tortuosity, orientation, extent. The data may be determined, for example, from previous measurements performed on branching structures of the same or similar type. For example, the data may represent a mean or median of previous measurements on patients or other subjects. The data may be cross-referenced or associated with other patient data, enabling for example selection of data representing an expected or typical value of a parameter of the branching structure or part of the branching structure for a patient of a particular age range, sex or suffering from a particular condition.

At stage 24, the landmark selection unit 13 selects a pair of landmarks which delineates a vessel segment in the FMA. Each pair of landmarks may, for example, represent the extremities of a vessel segment in the FMA.

Figure 6:
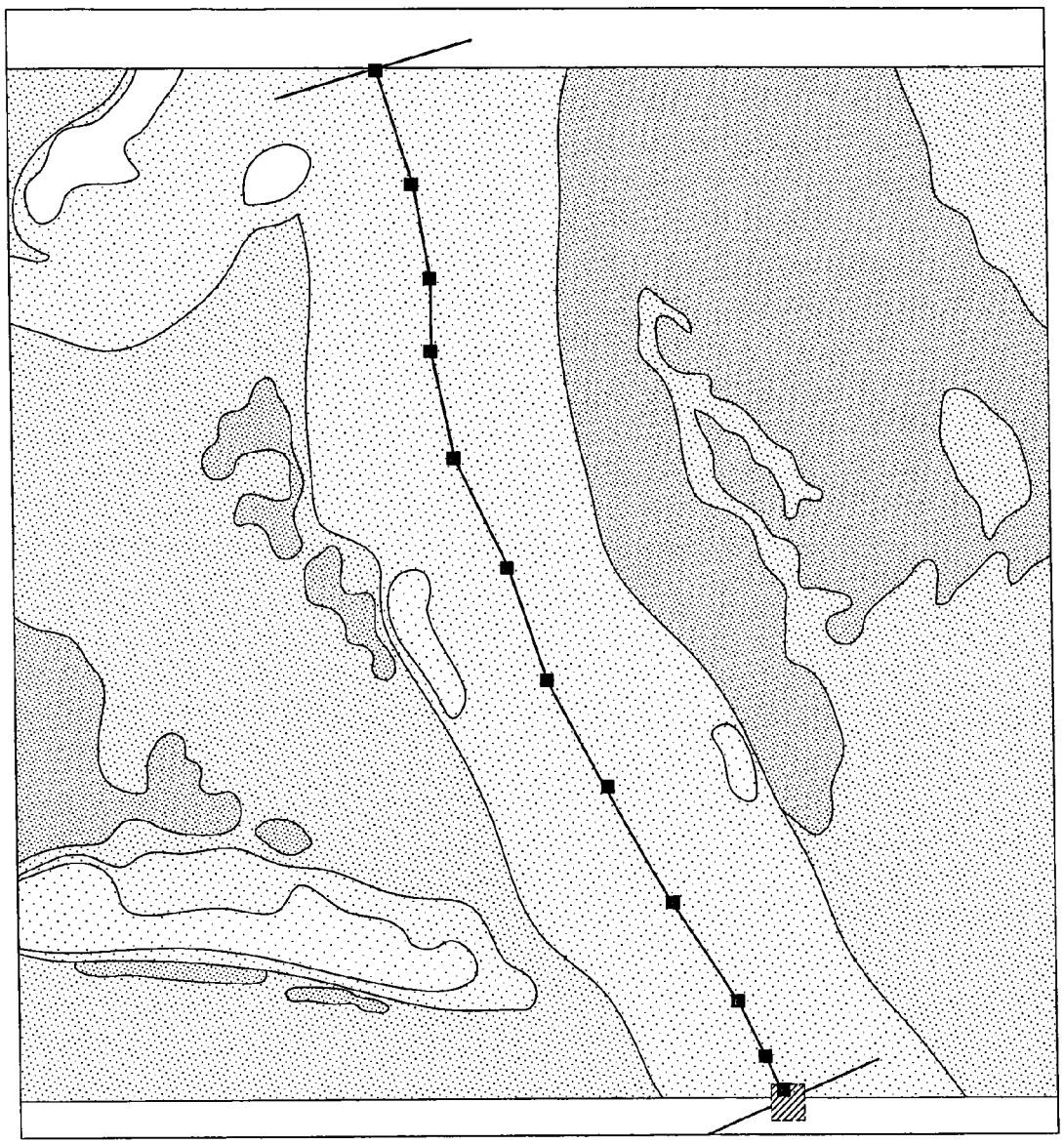
FIG. 6 illustrates the tracking of a vessel segment between the aorta-iliac bifurcation and the left inner/outer iliac bifurcation according to a mode of operation of the image processing system of FIG. 1.

At the next stage of the process 26, the spatial analysis unit 16 runs a vessel tracking algorithm to determine the spatial configuration of the vessel segment from the 3D image data set 7 and may use information from the FMA or other anatomical representation to assist in that determination. In the embodiment of FIG. 1, the tracking algorithm quantitatively determines a path or centerline of the vessel segment as illustrated in FIG. 6. Tracking a vessel centerline in a contrasted study given start and end points is a well constrained problem and mature solutions exist. Any suitable vessel tracking algorithm can be used, for example that provided in Voxar 3D VesselMetrix based on a modified Dijkstra minimum cost path algorithm as described in U.S. Pat. No. 7,379,062.

At stage 28, the graphics unit 18 controls display device 4 to display an image representing the determined spatial configuration of the vessel segment and the label of the vessel segment, together with at least a portion of the 3D image data set 7 corresponding to the vessel segment. The graphics unit 18 may, therefore, provide for simultaneous viewing of at least a portion of the 3D image data set 7 together with the spatial configuration of the vessel segment and the label of the vessel segment on the display device 4.

At stage 30, the processing apparatus 2 determines whether to look for any more vessel segments in the 3D image data set 7. The determination can be made with reference to the stored anatomical representation, for example based upon a determination of which further landmarks are expected to be linked via further segments to the already-identified vessel segment, and upon user input as to which portions of the branching structure it is desired to locate and identify. If suitable further vessel segments are identified in the stored anatomical representation, the processing apparatus 2 repeats stages 24, 26 and 28, for example until no further vessel segments are found or until the end of a particular tree structure is reached.

The determined spatial configuration, in this case the determined vessel centreline, may then be used at stage 32 for any desired purpose, for example as an input to a display or segmentation process. At stage 32 in the described example, the graphics unit 18 generates a signal for displaying the centerline for each of the vessel segments of the vascular tree and the corresponding segment labels on the display device 4. In an alternative mode of operation, the determined vessel centreline is used as an input to a segmentation algorithm that determines the entire vessel—i.e. not just its centreline, but, for example, every voxel that is considered to be contained within the vessel lumen. In further embodiments, the determined spatial configuration can be used as an input to any other suitable process.

Figure 7:
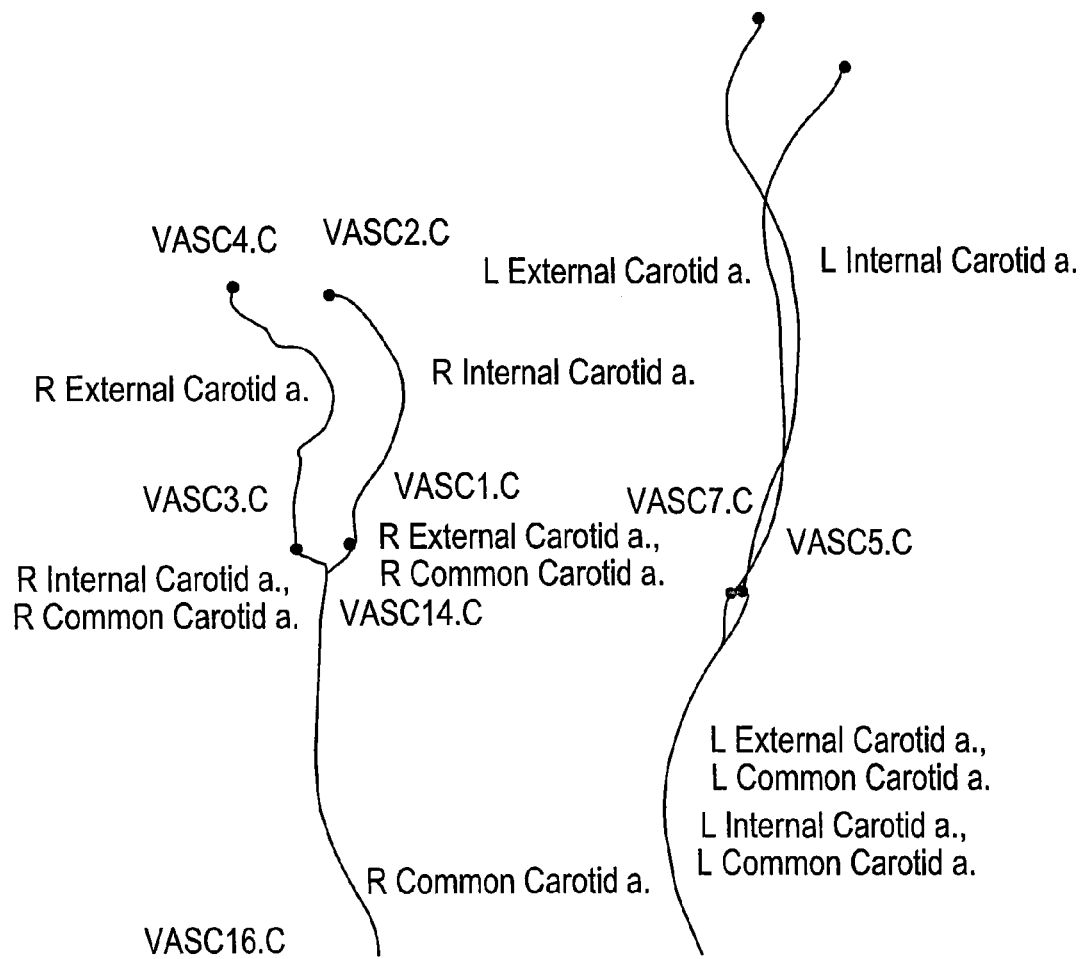
FIG. 7 illustrates a centerline of a vascular tree including carotid vessels displayed according to a mode of operation of the image processing system of FIG. 1.

FIG. 7 illustrates an example of the resulting centerline of a vascular tree showing carotid vessels. The graphics unit 18 may also generate a signal for displaying the corresponding portion of the 3D image data set 7 on the display device 4 if desired (not shown in FIG. 7).

A further landmark identification and vessel tracking process that can be performed by the embodiment of FIG. 1, or a variant of that embodiment, is now described with reference to FIG. 8. In the process of FIG. 2 described above, a pair of landmarks is identified and vessel tracking is performed between the identified landmarks of the pair. In contrast, it is a feature of the process of FIG. 8 that the tracking process can be performed based on a single landmark, for example a landmark that, according to a stored anatomical representation, is most distal from the root of the branching structure for at least one path through the branching structure.

Figure 8:
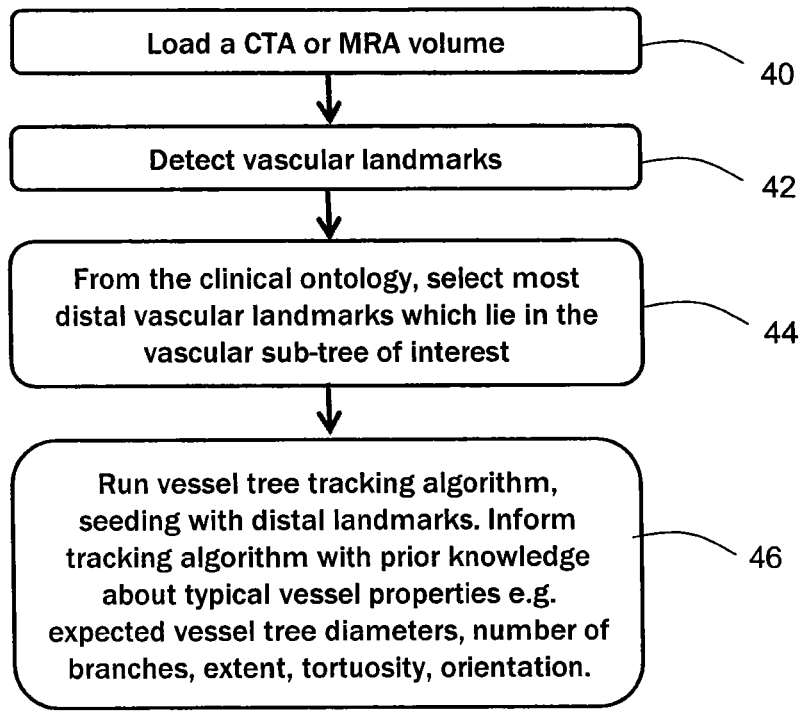
FIG. 8 is a flowchart chart illustrating in overview a further mode of operation of the image processing system of FIG. 1 according to an embodiment.

At the first stage 40 of the process of FIG. 8, the processing apparatus 2 receives a 3D image data set 7 from the data store 9 or directly from the CT scanner 6 or, in other embodiments, from other types of scanner.

At the next stage 42, the landmark identification unit 12 automatically detects landmarks such as branch points of a vascular tree in the 3D image data set 7 using any suitable techniques, as described above in relation to stage 22 of the process of FIG. 2.

At the next stage 44 of the process, the landmark selection unit 13 receives an anatomical representation (for example, a clinical ontology or other anatomical representation as described above in relation to stage 24 of FIG. 3) and selects a landmark from amongst the one or more landmarks identified at stage 42, based upon the stored anatomical representation. In this case, the landmark is selected as being a landmark that, according to the stored anatomical representation is most distal from the root of a branching structure (in this case, the vascular tree) for at least one path through the branching structure. In this example, the selected landmark is the most distally available vascular landmark.

It is a feature of the anatomical representation, for example the clinical ontology, that it is straightforward to identify the most distal identified landmarks of a particular vascular tree, or other branching structure, as the anatomical representation can include data that represents relationships between different landmarks, for example the names of particular landmarks, the vessel or other structures associated with (for example leading to or from) particular landmarks, and whether and how particular landmarks are connected by vessels or other structures.

At the next stage 46, a seeded vessel tree tracking process is performed by the spatial analysis unit 16, which comprises running a vessel tree tracking algorithm seeded with information relating to the identified distal landmark. The vessel tree tracking algorithm in this case determines a path or centerline of the vessel or other structure in a direction away from a root of the vessel tree or other branching structure.

Any suitable vessel tree tracking algorithm may be used, for example that provided in Voxar 3D VesselMetrix based on a modified Dijkstra minimum cost path algorithm described in U.S. Pat. No. 7,379,062, as mentioned above in relation to stage 26 of FIG. 2. Alternatively, any other suitable vessel tracking algorithm may be used, for example an algorithm that tracks the direction of a greatest intensity, referred to as a greedy tracker, or a region-growing algorithm. Any suitable class of vessel tree tracking algorithm may be used, for example minimum-cost path algorithms, level-set methods, atlas-based algorithms, particle filter-based algorithms.

It is a feature of the embodiment of FIG. 8 that the tracking algorithm is performed in dependence on data from the stored anatomical representation, for instance data that represents a typical value of the vessel structure, or other branching structure, associated with the landmark. For example, the tracking algorithm may be informed with prior knowledge of typical or expected vessel properties, for instance expected vessel tree diameter, number of branches, extent, tortuosity, orientation, tree size.

By informing the vessel tree tracking algorithm using information from the clinical ontology or other anatomical representation, the vessel tracking algorithm can provide for a more accurate determination of the vessel tree and/or a more rapid or efficient performance of the vessel tree tracking process, even though only a single point on the tree may be used as a starting point.

Figure 9:
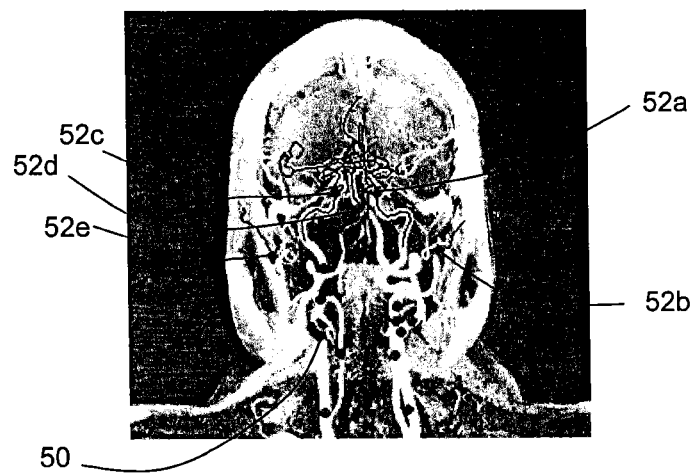
FIG. 9 is an illustration of a scan of the carotid artery tree structure in which multiple landmarks have been identified.

FIG. 9 is an illustration of a scan of the carotid artery tree structure in which multiple landmarks have been identified (represented by solid dots 50 in the figure). In this case, each of five landmarks 52a, 52b, 52c, 52d, 52e has been selected as being the most distal from a root of the carotid artery structure along a respective branch of the structure. For each of the selected landmarks 52a, 52b, 52c, 52d, 52e, the tracking algorithm (in this case, a region growing algorithm) has been run, informed by information from the clinical ontology, and the resulting vessel centrelines are indicated with solid lines in FIG. 9, overlaid on the scan.

Figure 10:
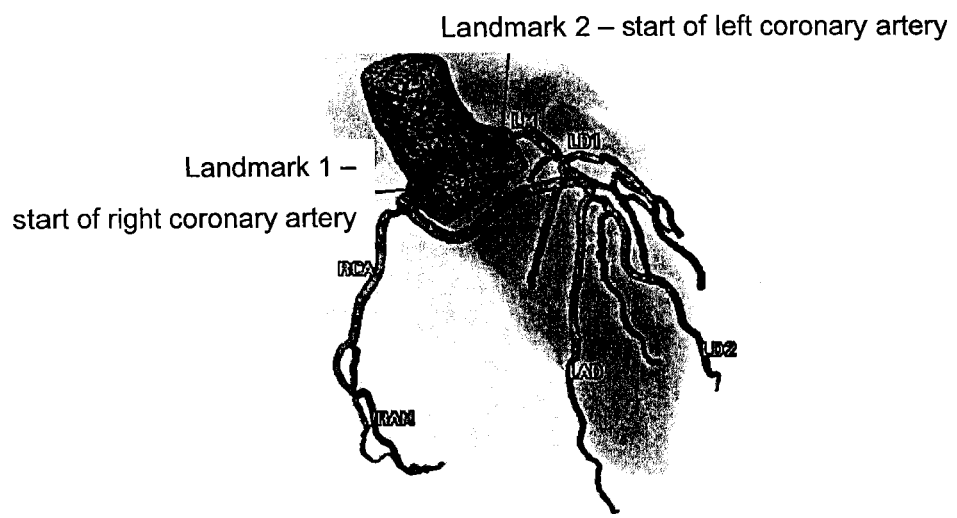
FIG. 10 is an illustration of the result of a tracker tracking coronary artery structures seeded from either of two single landmarks and performed in dependence on expected properties of the structures determined from a clinical ontology.

FIG. 10 is an illustration of the result of the output greedy tracker tracking coronary artery structures seeded from either of two single landmarks (in this case, the start of the right coronary artery or the start of the left coronary artery) and performed in dependence on expected properties of the structures determined from the clinical ontology.

Although it is mentioned above that the selected landmark may be a landmark that is most distal from a root of the branching structure for at least one path through the branching structure, in some cases the landmark may nevertheless be at the or near a root of the branching structure. That may the case if, for example, only a single landmark has been identified from the scan data, or in the case where the clinical ontology or other anatomical representation contains only a single landmark for a particular branching structure.

Tracking a vessel tree in a contrasted study given a seed point at the vessel tree root again can be difficult since there is usually considerable variation between vessel trees for characteristics such as, for example, the size of the tree, the density of branching, the tortuosity of the vessels and their typical diameters. It is a feature of the process of the FIG. 8 that it can be used to determine the spatial configuration of a branching structure, or part of the branching structure, even when the selected landmark is at or near the root. Again the tracking algorithm is informed by information from the clinical ontology, or other anatomical representation, which may include information concerning expected or typical properties, for instance one or more of vessel diameter, number of branches, tortuosity, orientation, extent. In some embodiments, the information may be selected from the anatomical representation or other clinical ontology based on at least one property of the patient. For example, information may be selected from the anatomical representation or other clinical ontology as being relevant based on the age or sex of the patient or based on whether the patient is suffering from a particular condition.

Figure 11:
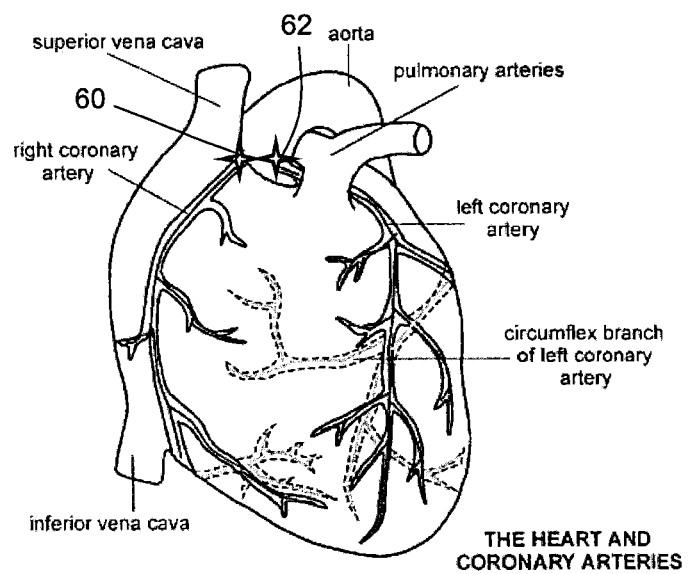
FIG. 11 is a schematic illustration of the heart and coronary arteries.

FIG. 11 is a schematic illustration of the heart and coronary arteries, in which two landmarks 60, 62 have been identified, one landmark 60 at the root of the right coronary artery and one landmark 62 at the root of the left coronary artery. In this case, the process of FIG. 8 is used to determine the spatial configuration of the right coronary artery and its sub-branches based on vessel tracking from the landmark 60 informed by information from the clinical ontology or other stored anatomical representation. Similarly, the process of FIG. 8 is used to determine the spatial configuration of the left coronary artery and its sub-branches based on vessel tracking from the landmark 62 informed by information from the clinical ontology or other stored anatomical representation.

Figure 12:
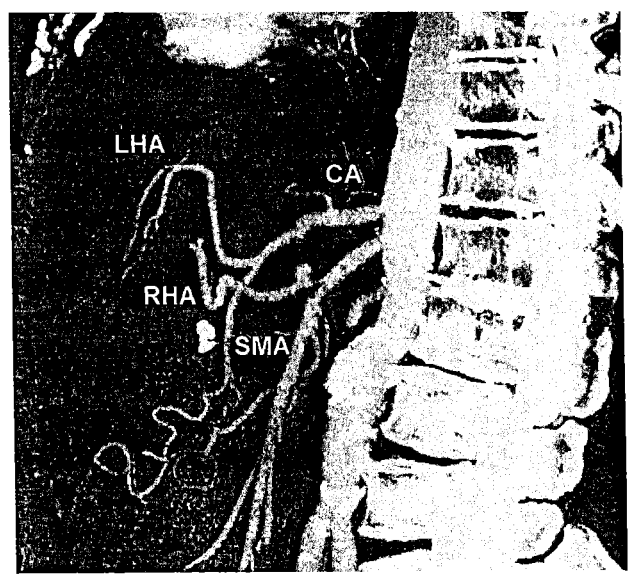
FIG. 12 shows the results of a scan of a vessel tree structure of the hepatic vasculature of a patient.

A further example of a vessel tree structure that can be tracked using the process of FIG. 8 from a starting point of a distal landmark is illustrated in FIG. 12. In this case, the vessel tree structure comprises the hepatic vasculature, and includes the superior mesenteric artery (SMA), the left hepatic artery (the LHA), the right hepatic artery (RHA), and the coeliac artery (CA). The tracking of distal parts of the hepatic vasculature can be useful, for example, in the planning of liver TACE (Transcatheter Arterial ChemoEmbolisation).

Although the determination of the spatial configuration of vessel segments of a vascular structure has been described, in alternative embodiments the spatial configuration of segments of other types of branching structure may be determined, and the landmarks may be landmarks associated with such alternative branching structures. The branching structure may, for example be, a lymph system structure, an airway structure, a nerve structure, or any other suitable type of branching structure.

The labels and the centerlines of the segments may be stored in the data store 9 or a remote data store (not shown) so as to preserve an association between the labels and centerlines of the segments. In addition, at least a portion of the 3D image data set corresponding to each segment may be stored in the data store 9 or the remote data store (not shown) so as to preserve an association between the labels, the centerlines and the 3D image data of the segments. Storing this information may permit retrieval of the stored labels and centerlines and, optionally, also retrieval of the corresponding 3D image data in response to a search request which includes the label of the segment. Thus, the processing apparatus 2 may enable the creation of a database which is readily interrogated and which may aid the visualisation of anatomy and pathology such as stenosis and aneurysm. Thus, the processing apparatus 2 may deliver an anatomically labelled tree over a wide range of anatomies, for a range of imaging modalities in which the vasculature or other structure is visible and may enhance the efficiency and/or accuracy of a diagnosis of a medical condition.

In other embodiments, the spatial configuration may include at least one of a size, a shape, a position, an orientation, a cross-section, a perimeter, a segmented domain, a voxel set, a dimension and a diameter of each vessel segment.

The processing apparatus 2 may allow stenosis and aneurysm to be quantified, and assigned to individual vessel segments. Additional advanced measurements such as automatic tortuosity measurements can be made on automatically identified vessel segments. The processing apparatus 2 may also enable vascular Computer Aided Detection of pathology (CAD), for example for the design of stents and the planning of stent deployment, or for planning and executing other percutaneous procedures.

In other embodiments, the anatomical representation may define properties of typical branching structures and the spatial analysis unit 16 may be configured to use said properties of typical branching structures to assist in determining the spatial configuration of segments from the 3D image data set. In particular, the anatomical representation may include quantitative data relating to typical branching structures. In one embodiment, the anatomical representation may include typical structure diameters. The tracking algorithm implemented by the spatial analysis unit 16 at stage 26 may use said properties of typical branching structures to improve or inform the tracking process.

In addition, since the processing apparatus 2 relies on the use of clinical ontologies, the processing apparatus 2 may enable the creation of a database storing quantitative spatial configuration of segments and segment labels which uses standard anatomical terms. Such a database may enable data mining and/or statistical analysis to be performed on large volumes of quantitative data supporting medical studies and investigations.

Embodiments may deliver an anatomically labelled tree structure over a wide range of anatomies, for a range of imaging modalities in which the vasculature or other branching structure is visible.

Some embodiments may provide a method for automatically locating and labelling a vascular sub-tree in 3D medical datasets, comprising a means for the detection of key vascular landmarks relating to an organ or anatomical region of interest, a graph relating vascular landmarks to vessel names, a means of tracking a vessel tree, given a seed point at the root of the tree. The tracking step may be informed by the known anatomical context of the sub-tree being tracked—e.g. typical vessel diameter, number of branch points, maximum extent. The method may be applied to CTA or MRA datasets for the purpose of vascular analysis, for the purpose of displaying vascular views.

It will be well understood by persons of ordinary skill in the art that whilst some embodiments may implement certain functionality by means of a computer program having computer-readable instructions that are executable to perform the method of the embodiments, the computer program functionality could be implemented in hardware (for example by means of a CPU or by one or more ASICs (application specific integrated circuits)), FPGAs (field programmable gate arrays) or GPUs (graphic processing units) or by a mix of hardware and software.

While particular units have been described herein, in alternative embodiments, functionality of one or more of those units can be provided by a single unit, processing resource or other component, or functionality provided by a single unit can be provided by two or more units or other components in combination. Reference to a single unit encompasses multiple components providing the functionality of that unit, whether or not such components are remote from one another, and reference to multiple units encompasses a single component providing the functionality of those units. For example, in some embodiments falling within the scope of the claimed invention the landmark identification unit and landmark selection unit may be provided as a single unit, processing resource or other component.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms and modifications as would fall within the scope of the invention.

The invention claimed is:

1. A medical image data processing apparatus, comprising:
a landmark selection unit implemented by circuitry and configured to select, as at least one seed point and based on a stored anatomical representation comprising a clinical ontology or anatomical atlas, at least one landmark that is associated with a segment of a branching structure;
a spatial analysis unit implemented by circuitry and configured to process a 3D image data set to determine a spatial configuration of at least part of the branching structure by tracking said at least part of the branching structure using the selected at least one landmark as said at least one seed point for the tracking; and
a landmark identification unit implemented by circuitry and configured to identify a plurality of landmarks in the 3D image data set, and detect each of the landmarks by performing a decision forest process, wherein
the landmark selection unit is configured to select the at least one landmark as being a landmark that, according to the stored anatomical representation, is most distal from the root of the branching structure for at least one path through the branching structure.

2. The apparatus according to claim 1, wherein the processing of the 3D image data set to determine said spatial configuration of said part of the branching structure is performed in dependence on data from the stored anatomical representation that represents a typical or expected value of at least one property of a branching structure.

3. The apparatus according to claim 2, wherein the typical or expected value is a typical or expected value for at least one of vessel diameter, number of branches, tortuosity, orientation or extent.

4. The apparatus according to claim 1, wherein the processing of the 3D image data set comprises using a tracking algorithm to process the 3D image data set, and the tracking algorithm is informed by said data from the stored anatomical representation.

5. The apparatus according to claim 1, wherein the landmark selection unit is configured to select said at least one of the landmarks from the plurality of identified landmarks.

6. The apparatus according to claim 5, wherein the landmark identification unit is configured to automatically detect the plurality of landmarks in the 3D image data set.

7. The apparatus according to claim 1, wherein the spatial configuration comprises at least one of a path, a centerline, a size, a shape, a position, an orientation, a cross-section, a perimeter, a dimension, or a diameter.

8. The apparatus according to claim 1, wherein the branching structure comprises at least one of a vascular structure, a lymph system structure, an airway structure, or a nerve structure.

9. The apparatus according to claim 1, further comprising a label identification unit implemented by circuitry and configured to identify a label for said at least part of the branching structure.

10. The apparatus according to claim 1, wherein the anatomical representation relates segments of the branching structure to landmarks and segments of the branching structure to labels for segments.

11. The apparatus according to claim 1, wherein the anatomical representation defines anatomical relationships using non-image data.

12. The apparatus according to claim 1, wherein the clinical ontology comprises at least one of the Foundation Model of Anatomy (FMA), SNOMED or RadLex.

13. The apparatus according to claim 5, wherein the landmark identification unit is configured to detect each of the landmarks by performing a machine learning process and the decision forest process.

14. The apparatus according to claim 1, wherein each of the landmarks coincides with a branch point or other distinctive point in the branching structure.

15. The apparatus according to claim 1, further comprising a data storage configured to store a label of said at least part of the branching structure and said determined spatial configuration to preserve an association between the label and the quantitative spatial configuration.

16. The apparatus according to claim 1, further comprising a data storage configured to store at least a portion of the image data set corresponding to said at least part of the branching structure to preserve an association between a label, the spatial configuration, and at least a portion of the image data set representing said at least part of the branching structure.

17. The apparatus according to claim 1, further comprising a graphics unit implemented by circuitry and configured to generate a signal for displaying a representation of said spatial configuration on a display device.

18. The apparatus according to claim 1, wherein at least one of: the anatomical representation defines properties of typical branching structures, the anatomical representation includes quantitative data relating to typical branching structures, or the anatomical representation includes typical vessel diameters or other structure diameters.

19. The apparatus according to claim 1, wherein the medical image data comprises at least one of CT data or MR data.

20. A medical image processing method, comprising:
   selecting, as at least one seed point and based on a stored anatomical representation comprising a clinical ontology or anatomical atlas, at least one landmark that is associated with a segment of a branching structure;
   processing a 3D image data set to determine a spatial configuration of at least part of the branching structure by tracking said at least part of the branching structure using the selected at least one landmark as said at least one seed point for the tracking;
   identifying a plurality of landmarks in the 3D image data set; and
   detecting each of the landmarks by performing a decision forest process, wherein
   the selecting includes selecting the at least one landmark as being a landmark that, according to the stored anatomical representation, is most distal from the root of the branching structure for at least one path through the branching structure.

21. A non-transitory computer-readable storage medium storing a computer program that when executed by a computer causes the computer to perform a method comprising:
   selecting, as at least one seed point and based on a stored anatomical representation comprising a clinical ontology or anatomical atlas, at least one landmark that is associated with a segment of a branching structure;
   processing a 3D image data set to determine a spatial configuration of at least part of the branching structure by tracking said at least part of the branching structure using the selected at least one landmark as said at least one seed point for the tracking;
   identifying a plurality of landmarks in the 3D image data set; and
   detecting each of the landmarks by performing a decision forest process, wherein
   the selecting includes selecting the at least one landmark as being a landmark that, according to the stored anatomical representation, is most distal from the root of the branching structure for at least one path through the branching structure.

* * * * *